United States Patent
Li et al.

(10) Patent No.: US 11,044,002 B2
(45) Date of Patent: Jun. 22, 2021

(54) BEAM CONTROL METHOD, BASE STATION AND USER EQUIPMENT

(71) Applicant: CHINA ACADEMY OF TELECOMMUNICATIONS TECHNOLOGY, Beijing (CN)

(72) Inventors: Chuanjun Li, Beijing (CN); Xin Su, Beijing (CN); Qiubin Gao, Beijing (CN); Rakesh Tamrakar, Beijing (CN); Runhua Chen, Beijing (CN); Hui Li, Beijing (CN); Qiuping Huang, Beijing (CN); Mengjun Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/608,789

(22) PCT Filed: Mar. 21, 2018

(86) PCT No.: PCT/CN2018/079827
§ 371 (c)(1),
(2) Date: Oct. 25, 2019

(87) PCT Pub. No.: WO2018/196518
PCT Pub. Date: Nov. 1, 2018

(65) Prior Publication Data
US 2020/0395992 A1    Dec. 17, 2020

(30) Foreign Application Priority Data
Apr. 27, 2017    (CN) .......................... 201710287696.4

(51) Int. Cl.
*H04B 7/02* (2018.01)
*H04B 7/06* (2006.01)
(Continued)

(52) U.S. Cl.
CPC ......... *H04B 7/0695* (2013.01); *H04B 7/0617* (2013.01); *H04B 7/086* (2013.01);
(Continued)

(58) Field of Classification Search
CPC ...... H04B 7/0695; H04B 7/086; H04B 7/088; H04B 7/0617; H04W 56/0015; H04W 74/0833; H04W 74/004
(Continued)

(56) References Cited

U.S. PATENT DOCUMENTS

2003/0201936 A1    10/2003    Kim
2005/0070331 A1     3/2005    Higuchi et al.
(Continued)

FOREIGN PATENT DOCUMENTS

CN    1455473 A    11/2003
CN    1581577 A    2/2005
(Continued)

OTHER PUBLICATIONS

First Office Action and search report from CN app. No. 201710287696.4, dated Jan. 21, 2020, with English translation provided by Global Dossier.
(Continued)

*Primary Examiner* — Don N Vo
(74) *Attorney, Agent, or Firm* — Ladas & Parry, LLP

(57) ABSTRACT

A beam control method, a base station and a user equipment are provided. The method includes: determining, by a base station, a type of a physical channel; and transmitting or receiving, by the base station, a signal of the physical channel by using a corresponding type of beam according to the type of the physical channel.

19 Claims, 6 Drawing Sheets

---

401 — determining, by a base station, a type of a physical channel

402 — transmitting or receiving, by the base station, a signal of the physical channel by using a corresponding type of beam according to the type of the physical channel

(51) Int. Cl.
*H04B 7/08* (2006.01)
*H04W 56/00* (2009.01)
*H04W 74/00* (2009.01)
*H04W 74/08* (2009.01)

(52) U.S. Cl.
CPC ........ *H04B 7/088* (2013.01); *H04W 56/0015* (2013.01); *H04W 74/004* (2013.01); *H04W 74/0833* (2013.01)

(58) Field of Classification Search
USPC ........................................................ 375/267
See application file for complete search history.

(56) References Cited

U.S. PATENT DOCUMENTS

| | | | |
|---|---|---|---|
| 2013/0121185 A1 | 5/2013 | Li et al. | |
| 2013/0272220 A1 | 10/2013 | Li et al. | |
| 2013/0286960 A1 | 10/2013 | Li et al. | |
| 2016/0337916 A1 | 11/2016 | Deenoo et al. | |
| 2017/0311301 A1 | 10/2017 | Yu et al. | |
| 2019/0104551 A1* | 4/2019 | Deenoo | H04W 72/0453 |
| 2019/0326934 A1* | 10/2019 | Kim | H04W 72/0446 |
| 2019/0349062 A1* | 11/2019 | Zhang | H04W 16/28 |
| 2020/0145079 A1* | 5/2020 | Marinier | H04W 74/0833 |

FOREIGN PATENT DOCUMENTS

| | | |
|---|---|---|
| CN | 104885377 A | 9/2015 |
| CN | 106559122 A | 4/2017 |
| WO | 2016086144 A1 | 6/2016 |
| WO | 2017030601 A1 | 2/2017 |

OTHER PUBLICATIONS

Extended European Search Report from EP app. No. 18791482.5, dated Mar. 18, 2020.
International Search Report from PCT/CN2018/079827, dated Jun. 15, 2018, with English translation from WIPO.
International Preliminary Report on Patentability from PCT/CN2018/079827, dated Oct. 19, 2019.
Written Opinion of the International Searching Authority from PCT/CN2018/079827, dated Jun. 15, 2018, with English translation from WIPO.
"Multi-TRP Transmission and interference coordination", R1-1704395, 3GPP TSG RAN WG1 Meeting #88bis, Spokane, USA, Apr. 3-7, 2017.
"Beam Management for Data Channel", R1-1704456, 3GPP TSG RAN WG1 Meeting #88bis, 3GPP TSG RAN WG1, Spokane, USA, Apr. 3-7, 2017.
Notice of Reasons for Refusal from JP app. No. 2019-558541, dated Mar. 2, 2021, with English translation from Global Dossier.
Notification of Reasons for Refusal from KR app. No. 10-2019-7034822, dated Apr. 15, 2021, with English translation from Global Dossier.
"Beam management Procedure for NR MIMO", R1-166089, 3GPP TSG RAN WG1 Meeting #86, Gothenburg, Sweden, Aug. 22-26, 2016.
"Beamformed Random Access in NR", R1-166419, 3GPP TSG RAN WG1 Meeting #86, Gothenburg, Sweden, Aug. 22-26, 2016.
"Design for RACH procedure for NR", R1-1610057, 3GPP TSG RAN WG1 Meeting #86bis, Lisbon, Portugal, Oct. 10-14, 2016.
"DL beam management", R1-1704229, 3GPP TSG RAN WG1 Meeting #88b, Spokane, USA, Apr. 3-7, 2017.

* cited by examiner

BEAM CONTROL METHOD, BASE STATION AND USER EQUIPMENT

CROSS-REFERENCE TO RELATED APPLICATIONS

This application is the U.S. national phase of PCT/CN2018/079827 filed on Mar. 21, 2018 which claims a priority to the Chinese Patent Application No. 201710287696.4 filed on Apr. 27, 2017, the disclosures of which are incorporated by reference herein in their entireties.

TECHNICAL FIELD

The present disclosure relates to the field of communication technology, and in particular, to a beam control method, a base station and a User Equipment.

BACKGROUND

In view of the important role of Multiple Input Multiple-Output (MIMO) technology for improving peak rate and system spectrum utilization, technical standards of wireless access such as Long Term Evolution (LTE)/LTE-Advanced (LTE-A) are established based on MIMO+OFDM (Orthogonal Frequency Division Multiplexing) technology. A performance gain of the MIMO technology comes from a spatial freedom that a multi-antenna system can obtain. Therefore, one of the most important evolution directions of the MIMO technology in the development of standardization is the expansion of dimensions.

In LTE Rel-8, up to 4 layers of MIMO transmission can be supported. Rel-9 focuses on an enhancement of Multi-User Multiple-Input Multiple-Output (MU-MIMO) technology, and may support up to 4 downlink data layers in MU-MIMO transmission of Transmission Mode (TM)-8. Rel-10 introduces and supports 8 antenna ports to further improve the spatial resolution of channel state information, and further expands the transmission capability of Single-User MIMO (SU-MIMO) to up to 8 data layers. Rel-13 and Rel-14 introduce FD-MIMO technology to support 32 ports for realizing beamforming in full dimensions and in a vertical direction.

In order to further enhance the MIMO technology, a large-scale antenna technology is introduced in mobile communication systems. For base stations, fully digital large-scale antennas can have up to 128/256/512 antenna units, and up to 128/256/512 transceiver units, where each antenna unit is connected with one transceiver unit. By transmitting pilot signals up to 128/256/512 antenna ports, the User Equipment (UE) is capable of measuring channel state information and providing feedback. For UEs, an antenna array of up to 32/64 antenna units can also be configured. Through the beamforming on both sides of the base station and the UE, a huge beamforming gain is obtained to compensate for signal attenuation caused by path loss. Especially in high-band communications, such as communications at the 30 GHz frequency, the path loss makes the coverage of wireless signals quite limited. Large-scale antenna technology can extend the coverage of wireless signals to a practical range.

SUMMARY

According to a first aspect of embodiments of the present disclosure, a beam control method is provided, which includes:

determining, by a base station, a type of a physical channel; and transmitting or receiving, by the base station, a signal of the physical channel by using a corresponding type of beam according to the type of the physical channel.

Optionally, the method further includes: configuring, by the base station, one or more of the following types of beams: a base station-transmitted common beam (BS TX common beam), a base station-received common beam (BS RX common beam), a base station-transmitted traffic beam (BS TX traffic beam), and a base station-received traffic beam (BS RX traffic beam).

Optionally, the method further includes: identifying, by the base station, a transceiving reciprocity relationship between the BS TX common beam and the BS RX common beam; or identifying, by the base station, a transceiving reciprocity relationship between the BS TX traffic beam and the BS RX traffic beam.

Optionally, the transmitting or receiving, by the base station, the signal of the physical channel by using the corresponding type of beam according to the type of the physical channel includes:

for a synchronization channel, using, by the base station, a BS TX common beam to transmit a synchronization signal to a User Equipment (UE); or for an uplink random access channel, using, by the base station, a BS RX common beam corresponding to a UE-transmitted common beam (UE TX common beam) to receive an uplink random access signal transmitted by the UE TX common beam.

Optionally, the synchronization signal transmitted by each BS TX common beam is beamformed by a beamforming weight corresponding to the BS TX common beam, and is transmitted after being beamformed.

Optionally, the synchronization signal is periodically transmitted based on a preamble; or the synchronization signal is periodically transmitted according to a fixed time domain resource and a fixed frequency domain resource; or the synchronization signal is periodically transmitted according to a time domain resource and a frequency domain resource at a predetermined offset; or the synchronization signal is aperiodically transmitted on demand.

Optionally, the synchronization signal includes an identifier of the BS TX common beam.

Optionally, the uplink random access signal transmitted by each UE TX common beam is beamformed by a beamforming weight corresponding to the UE TX common beam, and is transmitted after being beamformed.

Optionally, the uplink random access signal includes an identifier of the UE TX common beam.

Optionally, the BS RX common beam corresponding to the UE TX common beam includes: a BS RX common beam having a transceiving reciprocity with a BS TX common beam with the best signal quality fed back by the UE; or a BS RX common beam with the best signal quality.

Optionally, the method further includes:

determining, by the base station, a common beam combination with the best signal quality according to a UE TX common beam and a BS RX common beam corresponding to the UE TX common beam, where the common beam combination with the best signal quality includes: a UE TX common beam with the best signal quality and a BS RX common beam with the best signal quality; and transmitting an identifier of the UE TX common beam with the best signal quality in the common beam combination with the best signal quality to the UE, and storing an identifier of the BS RX common beam with the best signal quality in the common beam combination with the best signal quality locally at the base station.

Optionally, the transmitting or receiving, by the base station, the signal of the physical channel by using the corresponding type of beam according to the type of the physical channel includes:

using, by the base station, a BS TX traffic beam to transmit a downlink beam training signal for a physical downlink shared channel (PDSCH) to the UE; or using, by the base station, a BS RX traffic beam corresponding to UE-transmitted traffic beam (UE TX traffic beam) to receive an uplink beam training signal for a physical uplink shared channel (PUSCH) transmitted by the UE TX traffic beam.

Optionally, the downlink beam training signal transmitted by each BS TX traffic beam is beamformed by a beamforming weight corresponding to the BS TX traffic beam, and is transmitted after being beamformed.

Optionally, the uplink beam training signal transmitted by each UE TX traffic beam is beamformed by a beamforming weight corresponding to the UE TX traffic beam, and is transmitted after being beamformed.

Optionally, the BS RX traffic beam corresponding to the UE TX traffic beam refers to: a BS RX traffic beam having a transceiving reciprocity with a BS TX traffic beam with the best signal quality fed back by the UE; or a BS RX traffic beam with the best signal quality.

Optionally, the method further includes:

determining, by the base station, a traffic beam combination with the best signal quality according to a UE TX traffic beam and a BS RX traffic beam corresponding to the UE TX traffic beam, where the traffic beam combination with the best signal quality includes: a UE TX traffic beam with the best signal quality and a BS RX traffic beam with the best signal quality; and transmitting an identifier of the UE TX traffic beam with the best signal quality in the traffic beam combination with the best signal quality to the UE, and storing an identifier of the BS RX traffic beam with the best signal quality in the traffic beam combination with the best signal quality locally at the base station.

Optionally, the transmitting or receiving, by the base station, the signal of the physical channel by using the corresponding type of beam according to the type of the physical channel includes:

using, by the base station, a BS TX traffic beam with the best signal quality fed back by the UE to transmit a PDSCH signal; or using, by the base station, a BS RX traffic beam with the best signal quality to receive a PUSCH signal.

Optionally, the method further includes: performing, in a case that at least one of the BS TX traffic beam with the best signal quality or the BS RX traffic beam with the best signal quality fails, a connection recovery process by the base station using at least one of the BS TX common beam with the best signal quality fed back by the UE, or the BS RX common beam with the best signal quality.

According to a second aspect of embodiments of the present disclosure, a beam control method is further provided, which includes:

determining, by a User Equipment (UE), a type of a physical channel; and receiving or transmitting, by the UE, a signal of the physical channel by using a corresponding type of beam according to the type of the physical channel.

Optionally, the method further includes: configuring, by the UE, one or more of the following types of beams: a UE-transmitted common beam (UE TX common beam), a UE-received common beam (UE RX common beam), a UE-transmitted traffic beam (UE TX traffic beam), and a UE-received traffic beam (UE RX traffic beam).

Optionally, the method further includes: identifying, by the UE, a transceiving reciprocity relationship between the UE RX common beam and a base station-received common beam (BS RX common beam); or identifying, by the UE, a transceiving reciprocity relationship between the UE RX traffic beam and the UE TX traffic beam.

Optionally, the receiving or transmitting, by the UE, the signal of the physical channel by using the corresponding type of beam according to the type of the physical channel includes:

for a synchronization channel, using, by the UE, a UE RX common beam corresponding to a base station-transmitted common beam (BS TX common beam) to receive a synchronization signal transmitted by the BS TX common beam; or for an uplink random access channel, using, by the UE, a UE TX common beam to transmit an uplink random access signal.

Optionally, the method further includes:

determining, by the UE, a common beam combination with the best signal quality according to a BS TX common beam and a UE RX common beam corresponding to the BS TX common beam, where the common beam combination with the best signal quality includes: a BS TX common beam with the best signal quality and a UE RX common beam with the best signal quality; and feeding back an identifier of the BS TX common beam with the best signal quality in the common beam combination with the best signal quality to a base station, and storing an identifier of the UE RX common beam with the best signal quality in the common beam combination with the best signal quality locally at the UE.

Optionally, the using, by the UE, the UE TX common beam to transmit the uplink random access signal includes:

using, by the UE, a UE TX common beam having a transceiving reciprocity with a UE RX common beam with the best signal quality to transmit the uplink random access signal; or transmitting, by the UE, an uplink random access signal via each candidate UE TX common beam.

Optionally, the receiving or transmitting, by the UE, the signal of the physical channel by using the corresponding type of beam according to the type of the physical channel includes:

using, by the UE, a UE RX traffic beam corresponding to the BS TX traffic beam to receive a downlink beam training signal for a PDSCH transmitted by a base station using the BS TX traffic beam; or using, by the UE, a UE TX traffic beam to transmit an uplink beam training signal for a PUSCH.

Optionally, the method further includes:

determining, by the UE, a traffic beam combination with the best signal quality according to a BS TX traffic beam and a UE RX traffic beam corresponding to the BS TX traffic beam, where the traffic beam combination with the best signal quality includes: a BS TX traffic beam with the best signal quality and a UE RX traffic beam with the best signal quality; and feeding back an identifier of the BS TX traffic beam with the best signal quality in the traffic beam combination with the best signal quality to the BS, and storing an identifier of the UE RX traffic beam with the best signal quality in the traffic beam combination with the best signal quality locally at the UE.

Optionally, the using, by the UE, the UE TX traffic beam to transmit the uplink beam training signal for the PUSCH includes:

using, by the UE, a UE TX traffic beam having a transceiving reciprocity with the UE RX traffic beam with the best signal quality to transmit the uplink beam training signal for the PUSCH; or transmitting an uplink beam training signal for the PUSCH by the UE via each candidate UE TX traffic beam.

Optionally, the receiving or transmitting, by the UE, the signal of the physical channel by using the corresponding type of beam according to the type of the physical channel includes:

using, by the UE, the UE RX traffic beam with the best signal quality to receive a PDSCH signal; or using, by the UE, the UE TX traffic beam with the best signal quality fed back by a base station to transmit a PUSCH signal.

Optionally, the method further includes: performing, in a case that at least one of the UE RX traffic beam with the best signal quality or the UE TX traffic beam with the best signal quality fails, a connection recovery process by the UE using at least one of the UE TX common beam with the best signal quality fed back by the base station, or the UE RX common beam with the best signal quality.

According to a third aspect of embodiments of the present disclosure, a base station is further provided, which includes:

a first determining module, configured to determine a type of a physical channel; and a first control module, configured to transmit or receive a signal of the physical channel by using a corresponding type of beam according to the type of the physical channel.

Optionally, the base station further includes: a first configuring module, configured to configure one or more of the following types of beams: a base station-transmitted common beam (BS TX common beam), a base station-received common beam (BS RX common beam), a base station-transmitted traffic beam (BS TX traffic beam), and a base station-received traffic beam (BS RX traffic beam).

Optionally, the base station further includes: a first identifying module, configured to identify a transceiving reciprocity relationship between the BS TX common beam and the BS RX common beam; or configured to identify a transceiving reciprocity relationship between the BS TX traffic beam and the BS RX traffic beam.

Optionally, the first control module is further configured to: for a synchronization channel, use a BS TX common beam to transmit a synchronization signal to a User Equipment (UE); or for an uplink random access channel, use a BS RX common beam corresponding to a UE-transmitted common beam (UE TX common beam) to receive an uplink random access signal transmitted by the UE TX common beam.

Optionally, the first control module is further configured to: use a BS TX traffic beam to transmit a downlink beam training signal for a physical downlink shared channel (PDSCH) to the UE; or use a BS RX traffic beam corresponding to the UE TX traffic beam to receive an uplink beam training signal for a physical uplink shared channel (PUSCH) transmitted by the UE TX traffic beam.

Optionally, the first control module is further configured to: use a BS TX traffic beam with the best signal quality fed back by the UE to transmit a PDSCH signal; or use a BS RX traffic beam with the best signal quality to receive a PUSCH signal.

Optionally, the base station further includes: a first connection recovering module, configured to perform, in a case that at least one of the BS TX traffic beam with the best signal quality or the BS RX traffic beam with the best signal quality fails, a connection recovery process by the base station using at least one of the BS TX common beam with the best signal quality fed back by the UE, or the BS RX common beam with the best signal quality.

According to a fourth aspect of embodiments of the present disclosure, a User Equipment (UE) is further provided, which includes:

a second determining module, configured to determine a type of a physical channel; and a second control module, configured to receive or transmit a signal of the physical channel by using a corresponding type of beam according to the type of the physical channel.

Optionally, the UE further includes: configuring, by the UE, one or more of the following types of beams: a UE-transmitted common beam (UE TX common beam), a UE-received common beam (UE RX common beam), a UE-transmitted traffic beam (UE TX traffic beam), and a UE-received traffic beam (UE RX traffic beam).

Optionally, the UE further includes: a second identifying module, configured to identify a transceiving reciprocity relationship between the UE RX common beam and a base station-received common beam (BS RX common beam); or identify a transceiving reciprocity relationship between the UE RX traffic beam and the UE TX traffic beam.

Optionally, the second control module is further configured to: for a synchronization channel, use a UE RX common beam corresponding to the base station-transmitted common beam (BS TX common beam) to receive a synchronization signal transmitted by the BS TX common beam; or for an uplink random access channel, use a UE TX common beam to transmit an uplink random access signal.

Optionally, the second control module is further configured to: use a UE RX traffic beam corresponding to the BS TX traffic beam to receive a downlink beam training signal for a PDSCH transmitted by the base station using the BS TX traffic beam; or use a UE TX traffic beam to transmit an uplink beam training signal for a PUSCH.

Optionally, the second control module is further configured to: use the UE RX traffic beam with the best signal quality to receive a PDSCH signal; or use the UE TX traffic beam with the best signal quality fed back by the base station to transmit a PUSCH signal.

Optionally, the base station further includes: a second connection recovering module, configured to perform, in a case that at least one of the UE RX traffic beam with the best signal quality or the UE TX traffic beam with the best signal quality fails, a connection recovery process by the UE using at least one of the UE TX common beam with the best signal quality fed back by the base station, or the UE RX common beam with the best signal quality.

According to a fifth aspect of the embodiments of the present disclosure, a base station is further provided, which includes: a first storage, a first processor, and a computer program that is stored in the first storage and executable by the first processor. When the program is executed by the first processor, the first processor is configured to perform steps in the beam control method according to the above first aspect.

According to a sixth aspect of the embodiments of the present disclosure, a User Equipment (UE) is further provided, which includes: a second storage, a second processor, and a computer program that is stored in the second storage and executable by the second processor. When the program is executed by the second processor, the second processor is configured to perform steps in the beam control method according to the above second aspect.

According to a seventh aspect of the embodiments of the present disclosure, a computer readable storage medium is further provided, on which a computer program is stored, where when the program is executed by a processor, steps in the beam control method according to the above first aspect are implemented, or steps in the beam control method according to the above second aspect are implemented.

One of the above technical solutions has the following advantages or advantageous effects: since the base station or UE may transmit or receive a signal of the physical channel by using a corresponding type of beam according to the type of the physical channel, a general beam management for different physical channels is realized, and the problem of lacking a general beam management method for different physical channels in the related art is solved, so that different types of beam can be configured for different physical channels, and access scheduling is reduced.

Further, the base station may identify a transceiving reciprocity relationship between the BS TX common beam and the BS RX common beam, the base station may identify a transceiving reciprocity relationship between the BS TX traffic beam and the BS RX traffic beam, the UE may identify a transceiving reciprocity relationship between the UE RX common beam and the UE TX common beam, and the UE may identify a transceiving reciprocity relationship between the UE RX traffic beam and the UE TX traffic beam. By configuring beams having a transceiving reciprocity, the beam training and scheduling time can be reduced.

Further, the base station side and the UE side may recover traffic connection by using the common beam when the connection state fails.

BRIEF DESCRIPTION OF THE DRAWINGS

In order to illustrate technical solutions of embodiments of the present disclosure in a clearer manner, the drawings desired for the embodiments of the present disclosure will be described hereinafter briefly. Obviously, the following drawings merely relate to some embodiments of the present disclosure, and based on these drawings, a person skilled in the art may obtain other drawings without creative effort.

DETAILED DESCRIPTION

Figure 1:
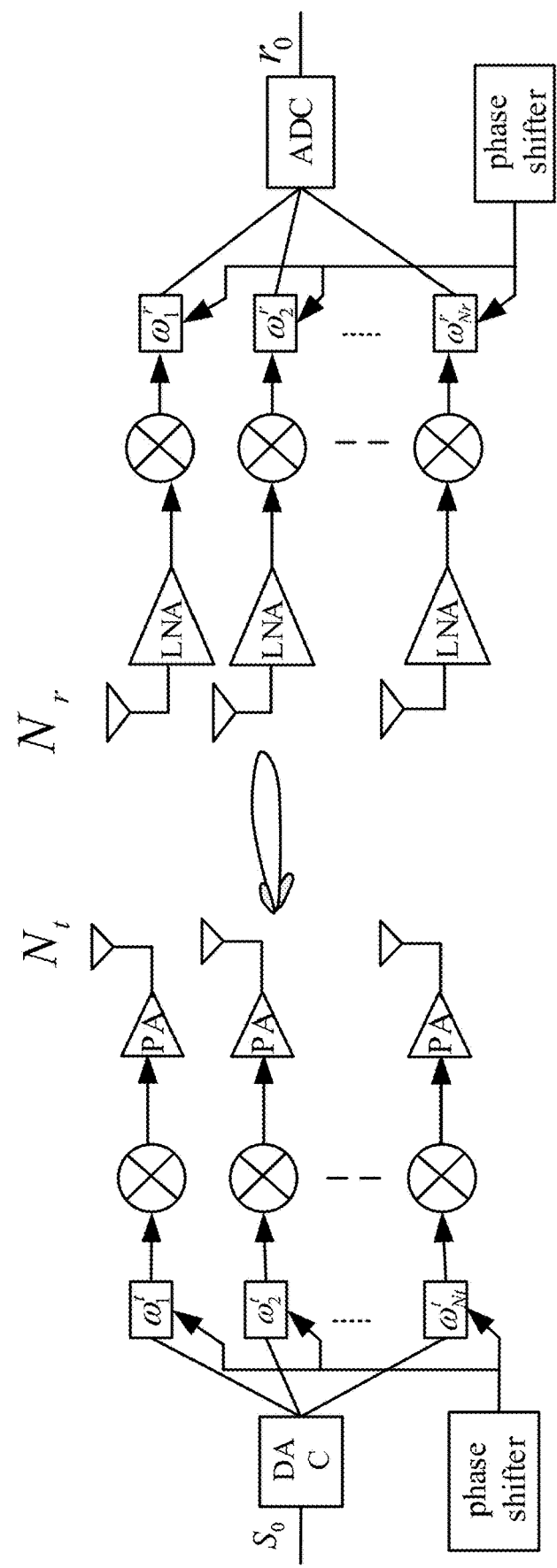
FIG. 1 is a schematic view of analog beamforming (weighted shaping of an intermediate frequency signal)

Exemplary embodiments of the present disclosure will be described in more detail below with reference to the accompanying drawings. While the exemplary embodiments of the present disclosure have been shown in the drawings, it should be understood that the present disclosure may be carried out in various forms without being limited by the embodiments set forth herein. Rather, these embodiments are provided so that the present disclosure can be understood more thoroughly and the scope of the disclosure can be fully conveyed to a person skilled in the art.

Figure 2:
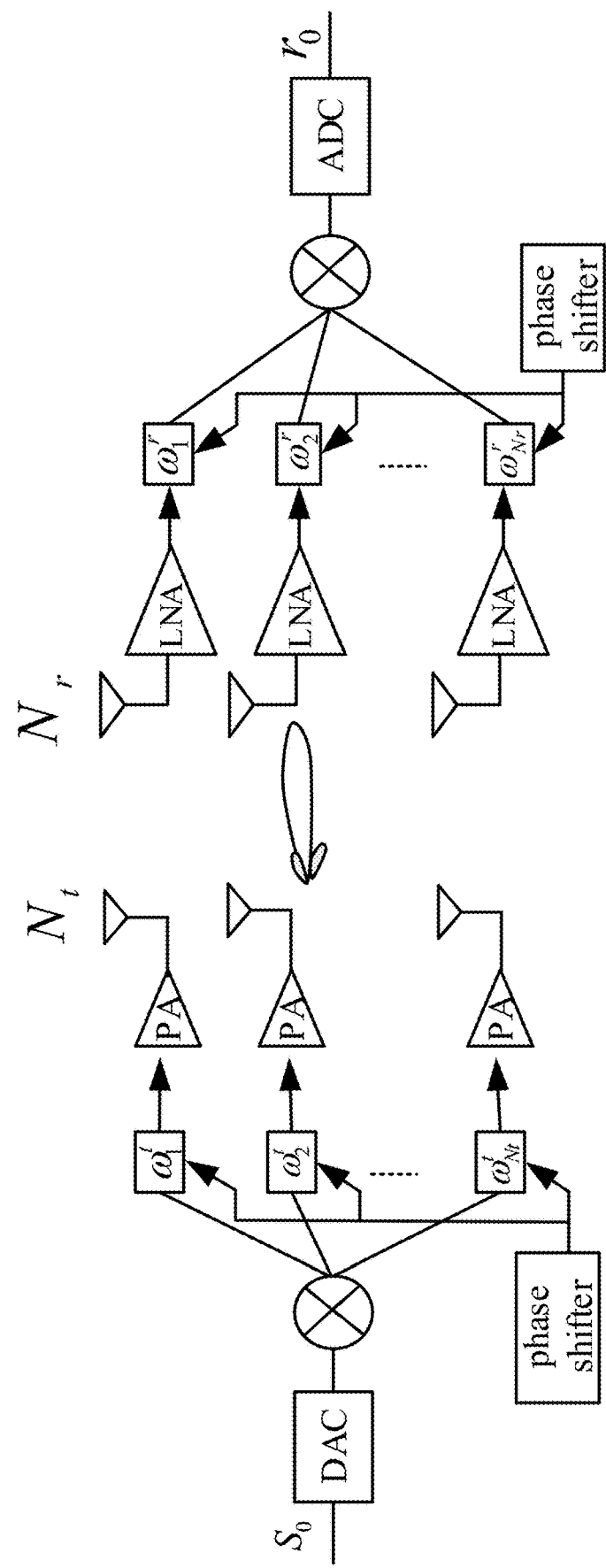
FIG. 2 is a schematic view of analog beamforming (weighted shaping of a radio frequency signal)

For an all-digital antenna array, each antenna unit has a separate transceiver unit, which will greatly increase the size, cost and power consumption of the device. Especially for the analog-to-digital converter (ADC) and digital-to-analog converter (DAC) of the transceiver unit, the power consumption has just been reduced by about 1/10 in the past decade, and the improvement on performance is relatively limited. In order to reduce the size, cost and power consumption of the device, a technical solution based on analog beamforming is proposed, as shown in FIGS. 1 and 2. The main characteristic of analog beamforming includes weighted shaping of the intermediate frequency (FIG. 1) or the radio frequency RF signal (FIG. 2) by a phase shifter. The advantage is that all transmit (receive) antennas have only one transceiver unit, which is simple to implement and reduces the cost, size and power consumption.

Figure 3:
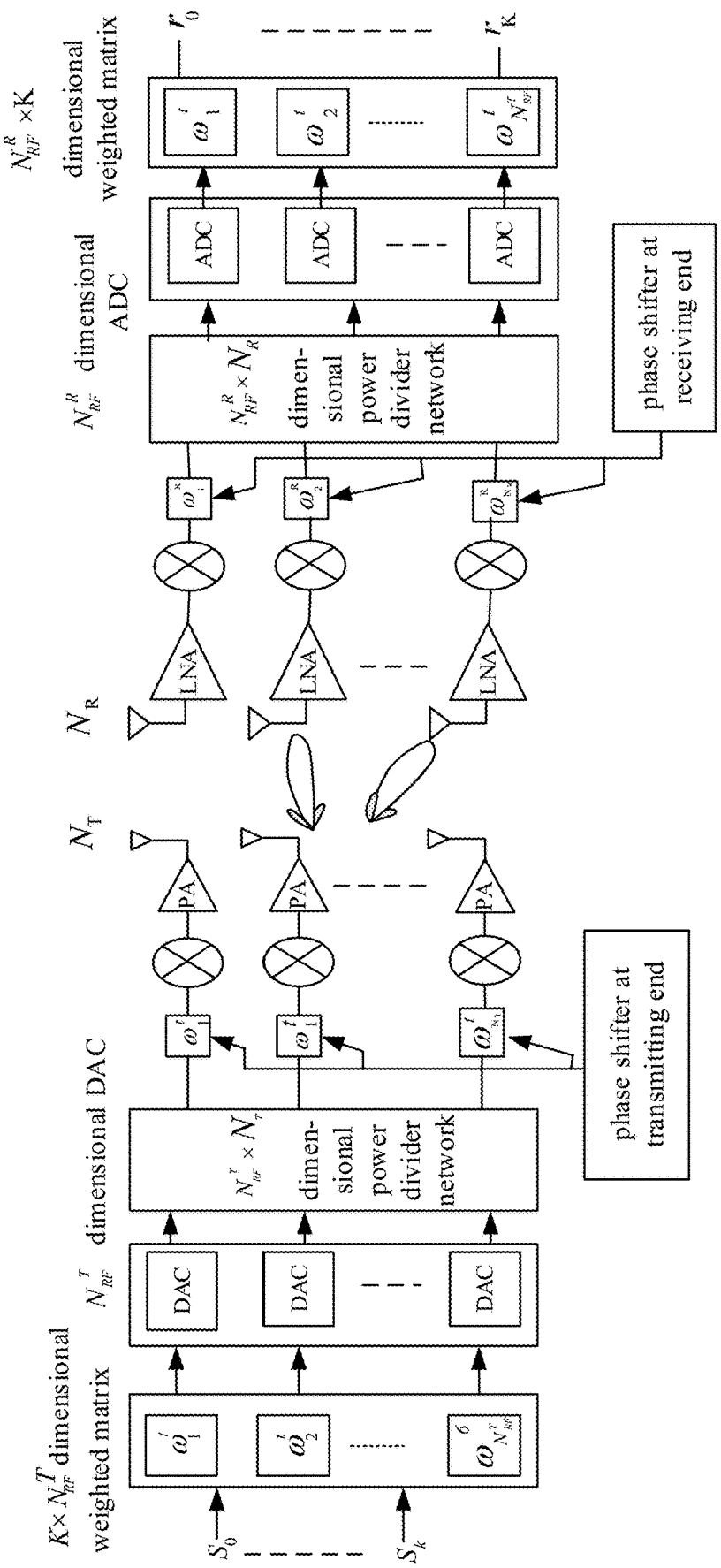
FIG. 3 is a schematic view of digital-analog hybrid beamforming.

In order to further improve the performance of analog beamforming, a digital-analog hybrid beamforming transceiver architecture solution is proposed, as shown in FIG. 3, in which the transmitting end and the receiving end respectively have $N_{RF}^T$ transceiver units and $N_{RF}^R$ transceiver units. The number of antenna units at the transmitting end $N^T > N_{RF}^T$, and the number of antenna units at the receiving end $N_R > N_{RF}^R$; and the number of maximum parallel transmission streams supported by beamforming is $\min(N_{RF}^T, N_{RF}^R)$. The hybrid beamforming structure of FIG. 3 balances the flexibility of digital beamforming and the low complexity of analog beamforming, has an ability to support multiple data streams and simultaneous shaping for multiple users, and meanwhile controls the complexity to be within a reasonable range.

Both analog beamforming and digital-to-analog hybrid beamforming require adjustment of an analog beamforming weight and a digital beamforming weight at both the transmitting end and the receiving end so that the resulting beam can be aligned with the opposite end of the communication. However, the access channel and the control channel are different from the traffic channel. For the access channel or the control channel, it is desired to use one transmission to access or control users in all directions of the cell. For a narrow beam, it is very difficult to realize accessing or controlling users in all directions of the cell by one transmission. Nevertheless, few transmissions as possible must be used to access or control users in all directions to improve the transmission reasonability, reliability, and effectiveness of the access or control. In contrast, the traffic channel is different, which is used for the transmission for one user, is more flexible, and has no requirement for coverage.

However, there is a lack for a general beam management method for the access channel, the control channel, and the traffic channel in the related art. In view of the above technical problem, embodiments of the present disclosure provide a beam control method, a base station and a User Equipment (UE), which realize a general beam management method for different physical channels, and solves the problem of lacking a general beam management method for different physical channels in the related art, so that different types of beam can be configured for different physical channels, and access scheduling is reduced.

Figure 4:
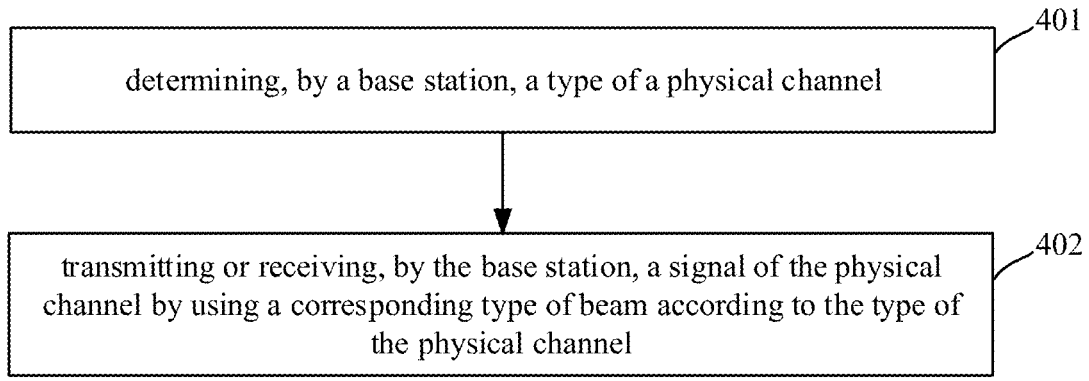
FIG. 4 is a flowchart of a beam control method in some embodiments of the present disclosure.

Referring to FIG. 4, a flowchart of a beam control method is shown, which includes step 401 and step 402.

Step 401: determining, by a base station, a type of a physical channel.

The above physical channel may include: an access channel, a control channel, a traffic channel, a synchronization channel, and the like.

Step 402: transmitting or receiving, by the base station, a signal of the physical channel by using a corresponding type of beam according to the type of the physical channel.

In some optional embodiments, the method further includes: configuring, by the base station, one or more of the following types of beams: a base station-transmitted common beam (BS TX common beam), a base station-received common beam (BS RX common beam), a base station-transmitted traffic beam (BS TX traffic beam), and a base station-received traffic beam (BS RX traffic beam).

In the embodiments, the base station transmits or receives a signal of the physical channel by using a corresponding type of beam according to the type of the physical channel; by configuring different types of beams for different physical channels, an access scheduling can be effectively reduced.

In some optional embodiments, the method further includes: identifying, by the base station, a transceiving reciprocity relationship between the BS TX common beam and the BS RX common beam; or identifying, by the base station, a transceiving reciprocity relationship between the BS TX traffic beam and the BS RX traffic beam. By configuring beams having a transceiving reciprocity, beam training time and beam scheduling time are reduced.

In some optional embodiments, the transmitting or receiving, by the base station, the signal of the physical channel by using the corresponding type of beam according to the type of the physical channel includes: for a synchronization channel, using, by the base station, a BS TX common beam to transmit a synchronization signal to a User Equipment (UE); or for an uplink random access channel, using, by the base station, a BS RX common beam corresponding to a UE-transmitted common beam (UE TX common beam) to receive an uplink random access signal transmitted by the UE TX common beam.

In some optional embodiments, the synchronization signal of each BS TX common beam is transmitted after being shaped by a beamforming weight corresponding to the BS TX common beam.

In some optional embodiments, the synchronization signal may be periodically transmitted according to a fixed time domain resource and a fixed frequency domain resource.

In some optional embodiments, the synchronization signal may be periodically transmitted according to a time domain resource and a frequency domain resource at a predetermined offset.

In some optional embodiments, the synchronization signal may be aperiodically transmitted on demand.

In some optional embodiments, the synchronization signal is periodically transmitted based on a preamble.

In some optional embodiments, the synchronization signal includes an identifier of the BS TX common beam.

In some optional embodiments, the uplink random access signal transmitted by each UE TX common beam is transmitted after being shaped by a beamforming weight corresponding to the UE TX common beam.

In this embodiment, the uplink random access signal includes an identifier of the UE TX common beam.

In some optional embodiments, the BS RX common beam corresponding to the UE TX common beam includes: a BS RX common beam having a transceiving reciprocity with a BS TX common beam with the best signal quality fed back by the UE; or a BS RX common beam with the best signal quality.

The above best signal quality means that the signal reception quality is best. In a case that signals are transmitted by BS TX common beams, and the signal reception quality of a signal transmitted by one BS TX common beam is the best on the UE side, the BS TX common beam may be referred to as the BS TX common beam with the best signal quality.

In a case that signals are received by BS RX common beams, and the signal reception quality of a signal received by one BS RX common beam is best, the BS RX common beam may be referred to as the BS RX common beam with the best signal quality.

In some optional embodiments, the method further includes: determining, by the base station, a common beam combination with the best signal quality according to a UE TX common beam and a BS RX common beam corresponding to the UE TX common beam, transmitting an identifier of the UE TX common beam with the best signal quality in the common beam combination with the best signal quality to the UE, and storing an identifier of the BS RX common beam with the best signal quality in the common beam combination with the best signal quality locally at the base station.

In some optional embodiments, the transmitting or receiving, by the base station, the signal of the physical channel by using the corresponding type of beam according to the type of the physical channel includes: using, by the base station, a BS TX traffic beam to transmit a downlink beam training signal for a physical downlink shared channel (PDSCH) to the UE; or using, by the base station, a BS RX traffic beam corresponding to the UE TX traffic beam to receive an uplink beam training signal for a physical uplink shared channel (PUSCH) transmitted by the UE TX traffic beam.

In some optional embodiments, the downlink beam training signal transmitted by each BS TX traffic beam is transmitted after being shaped by a beamforming weight corresponding to the BS TX traffic beam; or the downlink beam training signal is transmitted periodically or aperiodically; or the uplink beam training signal transmitted by each UE TX traffic beam is transmitted after being shaped by a beamforming weight corresponding to the UE TX traffic beam.

In some optional embodiments, the BS RX traffic beam corresponding to the UE TX traffic beam includes: a BS RX traffic beam having a transceiving reciprocity with a BS TX traffic beam with the best signal quality fed back by the UE; or a BS RX traffic beam with the best signal quality.

The above best signal quality means that the signal reception quality is best.

In a case that a signal is transmitted by the BS TX traffic beam, if the signal reception quality is best on the UE side, the BS TX traffic beam may be referred to as the BS TX traffic beam with the best signal quality.

In a case that a signal is received by the BS RX traffic beam, if the signal reception quality is best, the BS RX traffic beam may be referred to as the BS RX traffic beam with the best signal quality.

In some optional embodiments, the transmitting or receiving, by the base station, the signal of the physical channel by using the corresponding type of beam according to the type of the physical channel further includes: determining, by the base station, a traffic beam combination with the best signal quality according to a UE TX traffic beam and a BS RX traffic beam corresponding to the UE TX traffic beam, transmitting an identifier of the UE TX traffic beam with the best signal quality in the traffic beam combination with the best signal quality to the UE, and storing an identifier of the BS RX traffic beam with the best signal quality in the traffic beam combination with the best signal quality locally at the base station.

In some optional embodiments, the transmitting or receiving, by the base station, the signal of the physical channel by using the corresponding type of beam according to the type of the physical channel includes: using, by the base station, a BS TX traffic beam with the best signal quality fed back by the UE to transmit a PDSCH signal; or using, by the base station, a BS RX traffic beam with the best signal quality to receive a PDSCH signal.

In some optional embodiments, the method further includes: in a case that failure occurs to the BS TX traffic beam with the best signal quality and/or the BS RX traffic beam with the best signal quality, performing a connection recovery process by the base station using the BS TX common beam with the best signal quality fed back by the UE, and/or performing a connection recovery process by the base station using the BS RX common beam with the best signal quality. The common beam is used to recover traffic connection in a case that the connection state fails.

Figure 5:
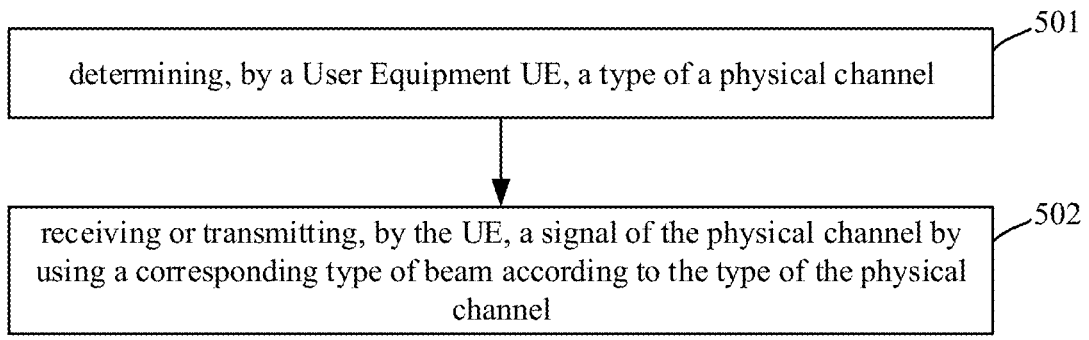
FIG. 5 is a flowchart of a beam control method in some other embodiments of the present disclosure.

Referring to FIG. 5, a flowchart of a beam control method at a UE side is shown, which includes the following specific steps:

step 501: determining, by a User Equipment (UE), a type of a physical channel; and step 502: receiving or transmitting, by the UE, a signal of the physical channel by using a corresponding type of beam according to the type of the physical channel.

In some optional embodiments, the method further includes: configuring, by the UE, one or more of the following types of beams: a UE-transmitted common beam (UE TX common beam), a UE-received common beam (UE RX common beam), a UE-transmitted traffic beam (UE TX traffic beam), and a UE-received traffic beam (UE RX traffic beam). In this embodiment, by configuring different types of beams for different physical channels, an access scheduling can be effectively reduced.

In some optional embodiments, the method further includes: identifying, by the UE, a transceiving reciprocity relationship between the UE RX common beam and the UE TX common beam; or identifying, by the UE, a transceiving reciprocity relationship between the UE RX traffic beam and the UE TX traffic beam.

In some optional embodiments, the receiving or transmitting, by the UE, the signal of the physical channel by using the corresponding type of beam according to the type of the physical channel includes: using, by the UE, a UE RX common beam corresponding to the base station-transmitted common beam (BS TX common beam) to receive a synchronization signal transmitted by the BS TX common beam; or using, by the UE, a UE TX common beam to transmit an uplink random access signal.

In some optional embodiments, the method further includes: determining, by the UE, a common beam combination with the best signal quality according to a BS TX common beam and a UE RX common beam corresponding to the BS TX common beam, feeding back an identifier of the BS TX common beam with the best signal quality in the common beam combination with the best signal quality to the BS, and storing an identifier of the UE RX common beam with the best signal quality in the common beam combination with the best signal quality locally at the UE.

In some optional embodiments, the using, by the UE, the UE TX common beam to transmit the uplink random access signal includes: using, by the UE, a UE TX common beam having a transceiving reciprocity with a UE RX common beam with the best signal quality to transmit the uplink random access signal; or transmitting an uplink random access signal by the UE via each candidate UE TX common beam.

In some optional embodiments, the receiving or transmitting, by the UE, the signal of the physical channel by using the corresponding type of beam according to the type of the physical channel includes: using, by the UE, a UE RX traffic beam corresponding to the BS TX traffic beam to receive a downlink beam training signal for a PDSCH transmitted by the base station using the BS TX traffic beam; or using, by the UE, a UE TX traffic beam to transmit an uplink beam training signal for a PUSCH.

In some optional embodiments, the method further includes: determining, by the UE, a traffic beam combination with the best signal quality according to a BS TX traffic beam and a UE RX traffic beam corresponding to the BS TX traffic beam, feeding back an identifier of the BS TX traffic beam with the best signal quality in the traffic beam combination with the best signal quality to the BS, and storing an identifier of the UE RX traffic beam with the best signal quality in the traffic beam combination with the best signal quality locally at the UE.

In some optional embodiments, the using, by the UE, the UE TX traffic beam to transmit the uplink beam training signal for the PUSCH includes: using, by the UE, a UE TX traffic beam having a transceiving reciprocity with the UE RX traffic beam with the best signal quality to transmit the uplink beam training signal for the PUSCH; or transmitting an uplink beam training signal for the PUSCH by the UE via each candidate UE TX traffic beam.

In some optional embodiments, the receiving or transmitting, by the UE, the signal of the physical channel by using the corresponding type of beam according to the type of the physical channel includes: using, by the UE, the UE RX traffic beam with the best signal quality to receive a PDSCH signal; or using, by the UE, the UE TX traffic beam with the best signal quality fed back by the base station to transmit a PDSCH signal.

In some optional embodiments, the method further includes: in a case that the UE RX traffic beam with the best signal quality and/or the UE TX traffic beam with the best signal quality fails, performing a connection recovery process by the UE using the UE TX common beam with the best signal quality fed back by the base station, and/or performing a connection recovery process by the UE using the UE RX common beam with the best signal quality.

Specific embodiments of the present disclosure are described below in connection with a general beam management of access channel, control channel and traffic channel.

In this embodiment, the base station configures four types of beams, and the UE configures four types of beams.

Figure 6:
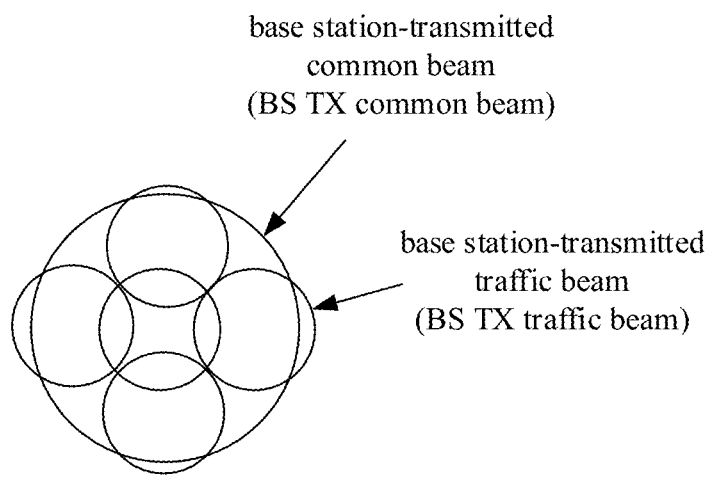
FIG. 6 is a schematic view of a BS TX common beam and a BS TX traffic beam in some embodiments of the present disclosure.

The base station configures four types of beams: a base station-transmitted common beam (BS TX common beam), a base station-received common beam (BS RX common beam), a base station-transmitted traffic beam (BS TX traffic beam), and a base station-received traffic beam (BS RX traffic beam). Referring to FIG. 6, the BS TX common beam and the BS TX traffic beam are shown. Access scheduling is reduced by configuring different types of beams for different physical channels.

At the same time, the base station identifies a BS RX common beam having a transceiving reciprocity with the BS TX common beam, and identifies a BS RX traffic beam having a transceiving reciprocity with the BS TX traffic beam. By configuring beams having a transceiving reciprocity, beam training and scheduling time is reduced.

It should be noted that if there is a transceiving reciprocity, the identification is implemented; and if there is no transceiving reciprocity, the identification is not implemented. The transceiving reciprocity may be identified at the base station side by a transmit beam, and may also be identified at the base station side by a receiving beam. Optionally, the transceiving reciprocity is identified at the base station side by a transmit beam.

Figure 7:
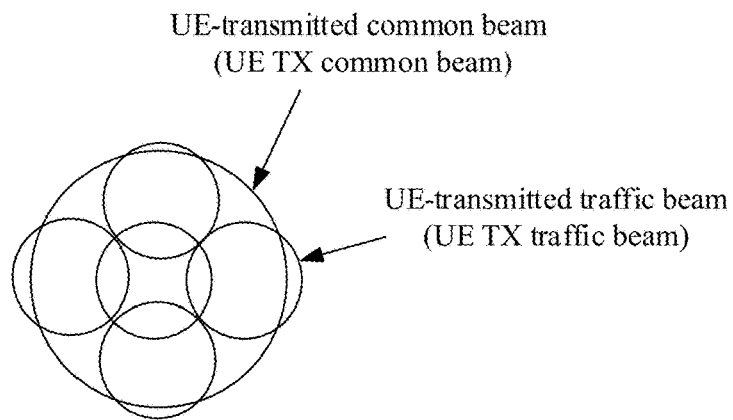
FIG. 7 is a schematic view of a UE TX common beam and a UE TX traffic beam in some embodiments of the present disclosure.

The UE configures four types of beams: a UE-transmitted common beam (UE TX common beam), a UE-received common beam (UE RX common beam), a UE-transmitted traffic beam (UE TX traffic beam), and a UE-received traffic beam (UE RX traffic beam). Referring to FIG. 7, the UE TX common beam and the UE TX traffic beam are shown. Access scheduling is reduced by configuring different types of beams for different physical channels.

At the same time, the UE identifies a UE TX common beam having a transceiving reciprocity with the UE RX common beam, and identifies a UE TX traffic beam having a transceiving reciprocity with the UE RX traffic beam. By configuring beams having a transceiving reciprocity, beam training and scheduling time is reduced.

It should be noted that if there is a transceiving reciprocity, the identification is implemented; and if there is no transceiving reciprocity, the identification is not implemented. The transceiving reciprocity may be identified at the UE side by a transmit beam, and may also be identified at the base station side by a receiving beam. Optionally, the transceiving reciprocity is identified at the UE side by a receiving beam.

The base station may use a corresponding type of beam to transmit (or receive) according to the type of the physical channel; and the UE may also use a corresponding type of beam to receive (or transmit) according to the type of the physical channel.

In an embodiment, the base station uses a BS TX common beam to transmit a synchronization signal, and the UE uses a UE RX common beam to receive the synchronization signal. The UE uses a UE TX common beam to transmit an uplink random access signal, and the base station uses a BS RX common beam to receive the uplink random access signal.

Specifically, the base station uses a BS TX common beam to transmit a synchronization signal.

It is assumed that the base station has a total of $N_{Traffic}^{BS,TX}$ candidate BS TX common beams, each of which corresponds to a group of beamforming weights. The beamforming weight of the n-th BS TX common beam is $W_{Common,n}^{BS,TX} = [w_1^n \ w_2^n \ \ldots \ w_K^n]^T$, where K is the number of antenna units of the beamforming, which may be smaller than the number of antenna units of the base station. For example, one BS TX common beam is transmitted from only K antenna units connected by one transceiver unit.

The base station may transmit a synchronization signal for each candidate BS TX common beam. For example, for $N_{Common}^{BS,TX}$ BS TX common beams, the base station may transmit $N_{Common}^{BS,TX}$ synchronization signals. The $N_{Common}^{BS,TX}$ synchronization signals may be multiplexed in a Time Division Multiplexed (TDM) or Frequency Division Multiplexed (FDM) manner, or may be used in a combination of various multiplexing manners. For example, in an OFDM-based system, the $N_{Common}^{BS,TX}$ synchronization signals may occupy $N_{Common}^{BS,TX}$ OFDM symbols, where each synchronization signal occupies 1 OFDM symbol, and the synchronization signals are multiplexed in a TDM manner. It is also possible to transmit synchronization signals of multiple beams in one OFDM symbol, and the synchronization signals are multiplexed in a FDM manner.

The synchronization signal transmitted by each BS TX common beam is transmitted after being shaped by a beamforming weight corresponding to the beam.

Optionally, the synchronization signal is periodically transmitted according to a fixed time domain resource and a fixed frequency domain resource, or the synchronization signal is periodically transmitted according to a time domain resource and a frequency domain resource at a predetermined offset, or the synchronization signal is aperiodically transmitted on demand, or the synchronization signal is periodically transmitted based on a preamble.

Optionally, the synchronization signal includes an identifier of the BS TX common beam.

The UE receives the synchronization signals transmitted by the base station, determines the reception quality of the $N_{Common}^{BS,TX}$ BS TX common beams after demodulating the synchronization signals, and determines the UE RX common beams corresponding to the BS TX common beams.

For one BS TX common beam, the UE determines a corresponding UE RX common beam. The UE RX common beam for the UE may be selected from candidate UE RX common beams. The UE has a total of $N_{Common}^{UERX}$ UE RX common beams, each of which corresponds to a group of beamforming weights. The beamforming weight of the n-th UE RX common beam is $V_{Common,n}^{UE,RX} = [v_1^n \ v_2^n \ \ldots \ v_L^n]^T$, where L is the number of antenna units of the beamforming, which may be smaller than the number of antenna units of the UE. For example, the signals received by the L antenna units are weighted by beamforming weights, and then combined and sent to a transceiver unit. For one synchronization signal, the UE may try to receive it by using each of the UE RX common beams separately, and select a UE RX common beam with the strongest signal receiving power as the receiving beam corresponding to the BS TX common beam.

The UE selects a common beam combination with the best signal quality from $N_{Common}^{BS,TX}$ BS TX common beams and $N_{Common}^{UE,RX}$ UE RX common beams, feeds back an identifier of the BS TX common beam with the best signal quality in the common beam combination with the best signal quality to the base station, and meanwhile stores an identifier of the UE RX common beam with the best signal quality in the common beam combination with the best signal quality locally at the UE.

Specifically, the UE uses a UE TX common beam having a transceiving reciprocity with a UE RX common beam with the best signal quality to transmit the uplink random access signal.

The UE searches for the UE TX common beam having a transceiving reciprocity corresponding to the identifier of the UE RX common beam with the best signal quality.

If there is a transceiving reciprocity relationship, the UE TX common beam having the transceiving reciprocity is used to transmit the uplink random access signal.

If there is no transceiving relationship, the uplink random access signal is transmitted in the following way.

It is assumed that the UE has a total of $N_{Common}^{UE,TX}$ candidate UE TX common beams, each of which corresponds to a group of beamforming weights. The beamforming weight of the n-th UE TX common beam is $V_{Common,n}^{UE,TX}=[v_1{}^n\ v_2{}^n\ \ldots\ v_L{}^n]^T$, where L is the number of antenna units of the beamforming, which may be smaller than the number of antenna units of the UE. For example, one UE TX common beam is transmitted from only L antenna units connected by one transceiver unit.

The UE may transmit an uplink random access signal for each candidate UE TX common beam. For example, for $N_{Common}^{UE,TX}$ UE TX common beams, the UE may transmit $N_{Common}^{UE,TX}$ uplink random access signals. The $N_{Common}^{UE,TX}$ uplink random access signals may be Time Division Multiplexed (TDM), or Frequency Division Multiplexed (FDM), or may be used in a combination of various multiplexing. For example, in an OFDM-based system, the $N_{Common}^{UE,TX}$ uplink random access signals may occupy $N_{Common}^{UE,TX}$ OFDM symbols, where each uplink random access signal occupies 1 OFDM symbol, and the uplink random access signals are multiplexed in a TDM manner. It is also possible to transmit uplink random access signals of multiple beams in one OFDM symbol, and the uplink random access signals are multiplexed in a FDM manner.

The uplink random access signal of each UE TX common beam is transmitted after being shaped by a beamforming weight corresponding to the beam.

The uplink random access signal may be an uplink random access signal carrying the identifier of UE TX common beam.

The base station receives the uplink random access signals transmitted by the UE, determines the reception quality of one or $N_{Common}^{UE,TX}$ UE TX common beams by demodulating the uplink random access signals, and determines the BS RX common beams corresponding to the UE TX common beams.

The base station searches for the BS RX common beam having a transceiving reciprocity with the BS TX common beam with the best signal quality.

If there is a transceiving reciprocity relationship, for one uplink random access signal, the base station uses the BS RX common beam having a transceiving reciprocity with the BS TX common beam with the best signal quality fed back by the UE, as the receiving beam corresponding to UE TX common beam.

If there is no transceiving reciprocity relationship, for one UE TX common beam, the base station determines a corresponding BS RX common beam. The BS RX common beam of the base station may be selected from candidate BS RX common beams. The base station has a total of $N_{Common}^{BS,RX}$ BS RX common beams, each of which corresponds to a group of beamforming weights. The beamforming weight of the n-th BS RX common beam is $W_{Common,n}^{BS,RX}=[w_1{}^n\ w_2{}^n\ \ldots\ w_K{}^n]^T$, where K is the number of antenna units of the beamforming, which may be smaller than the number of antenna units of the base station. For example, the signals received by the K antenna units are weighted by beamforming weights, and then combined and sent to a transceiver unit. For one uplink random access signal, the base station may try to receive it by using each of the BS RX common beams separately, and select the BS RX common beam with the strongest signal receiving power as the receiving beam corresponding to the UE TX common beam.

The base station selects a common beam combination with the best signal quality from one or $N_{Common}^{UE,RX}$ UE TX common beams and one or $N_{Common}^{BS,RX}$ BS RX common beams, feeds back an identifier of the UE TX common beam with the best signal quality in the common beam combination with the best signal quality to the UE, and meanwhile stores an identifier of the BS RX common beam with the best signal quality in the common beam combination with the best signal quality locally at the base station.

In an embodiment, the base station uses a BS TX traffic beam to transmit a downlink beam training signal for the PDSCH, and the UE uses a UE RX traffic beam to receive the downlink beam training signal for the PDSCH. The UE uses a UE TX traffic beam to transmit an uplink beam training signal for the PUSCH, and the base station uses a BS RX traffic beam to receive the uplink beam training signal for the PUSCH.

Specifically, the base station uses the BS TX traffic beam to transmit the downlink beam training signal for the PDSCH.

It is assumed that the base station has a total of $N_{Traffic}^{BS,TX}$ candidate BS TX traffic beams, each of which corresponds to a group of beamforming weights. The beamforming weight of the n-th BS TX traffic beam is $W_{Traffic,n}^{BS,TX}=[w_1{}^n\ w_2{}^n\ \ldots\ w_K{}^n]^T$, where K is the number of antenna units of the beamforming, which may be smaller than the number of antenna units of the base station. For example, one BS TX traffic beam is transmitted from only K antenna units connected by one transceiver unit.

The base station may transmit a beam training signal (or referred to as beam identification signal) for each candidate BS TX common beam. For example, for $N_{Traffic}^{BS,TX}$ BS TX traffic beams, the base station may transmit $N_{Traffic}^{BS,TX}$ beam training signals. The $N_{Traffic}^{BS,TX}$ training signals may be Time Division Multiplexed (TDM), or Frequency Division Multiplexed (FDM), or Code Division Multiplexed (CDM), or may be used in a combination of various multiplexing manners. For example, in an OFDM-based system, the $N_{Traffic}^{BS,TX}$ training signals may occupy $N_{Traffic}^{BS,TX}$ OFDM symbols, where each training signal occupies 1 OFDM symbol, and the training signals are multiplexed in a TDM manner. It is also possible to transmit training signals of multiple beams in one OFDM symbol, and the training signals are multiplexed in a FDM or CDM manner The beam training signal of each BS TX traffic beam is transmitted after being shaped by a beamforming weight corresponding to the beam.

The beam training signals are transmitted periodically, or transmitted aperiodically.

The UE receives the beam training signal for the PDSCH transmitted by the base station, determines the reception quality of the $N_{Traffic}^{BS,TX}$ BS TX traffic beams by measuring the beam training signals, and determines UE RX traffic beams corresponding to the BS TX traffic beams. The reception quality of the BS TX traffic beams may be characterized by reference signal receiving power (RSRP), or may be characterized by other measurements.

For one BS TX traffic beam, the UE determines a corresponding UE RX traffic beam. The UE RX traffic beam of the UE may be selected from candidate UE RX traffic beams. The UE has a total of $N_{Traffic}^{UE,RX}$ UE RX traffic beams, each of which corresponds to a group of beamforming weights. The beamforming weight of the n-th UE RX traffic beam is $V_{Traffic,n}^{UE,RX}=[v_1{}^n\ v_2{}^n\ \ldots\ v_L{}^n]^T$, where L is the number of antenna units of the beamforming, which may be smaller than the number of antenna units of the UE. For example, the signals received by the L antenna units are weighted by beamforming weights, and then combined and sent to a transceiver unit. For one synchronization signal, the UE may try to receive it by using each UE RX traffic beam separately, and select the UE RX traffic beam with the strongest signal receiving power as the receiving beam corresponding to the BS TX traffic beam.

The UE selects a traffic beam combination with the best signal quality from $N_{Traffic}^{BS,TX}$ BS TX traffic beams and $N_{Traffic}^{UE,RX}$ UE RX traffic beams, feeds back an identifier of the BS TX traffic beam with the best signal quality in the traffic beam combination with the best signal quality to the base station, and meanwhile stores an identifier of the UE RX traffic beam with the best signal quality in the traffic beam combination with the best signal quality locally at the UE.

Specifically, the UE uses a UE TX Traffic Beam having a transceiving reciprocity with a UE RX traffic beam with the best signal quality to transmit the uplink beam training signal for the PUSCH.

The UE searches for the UE TX traffic beam having a transceiving reciprocity corresponding to the identifier of the UE RX traffic beam with the best signal quality.

If there is a transceiving reciprocity relationship, the UE TX traffic beam having the transceiving reciprocity is used to transmit the uplink beam training signal.

If there is no transceiving relationship, it is assumed that the UE has a total of $N_{Traffic}^{UE,TX}$ candidate UE TX traffic beams, each of which corresponds to a group of beamforming weights. The beamforming weight of the n-th UE TX traffic beam is $V_{Traffic,n}^{UE,TX}=[v_1^n \ v_2^n \ \ldots \ v_L^n]^T$, where L is the number of antenna units of the beamforming, which may be smaller than the number of antenna units of the UE. For example, one UE TX traffic beam is transmitted from only L antenna units connected by one transceiver unit.

The UE may transmit an uplink beam training signal via each candidate UE TX traffic beam. For example, for $N_{Traffic}^{UE,TX}$ UE TX traffic beams, the UE may transmit $N_{Traffic}^{UE,TX}$ uplink beam training signals. The $N_{Traffic}^{UE,TX}$ uplink beam training signals may be Time Division Multiplexed (TDM), or Frequency Division Multiplexed (FDM), or Code Division Multiplexed (CDM), or may be used in a combination of various multiplexing. For example, in an OFDM-based system, the $N_{Traffic}^{UE,TX}$ uplink beam training signals may occupy $N_{Traffic}^{UE,TX}$ OFDM symbols, where each uplink beam training signal occupies 1 OFDM symbol, and the uplink beam training signals are Time Division Multiplexed (TDM). It is also possible to transmit uplink beam training signals of multiple beams in one OFDM symbol, and the uplink beam training signals are Frequency Division Multiplexed (FDM), or Code Division Multiplexed (CDM).

The uplink beam training signal of each UE TX traffic beam is transmitted after being shaped by a beamforming weight corresponding to the beam.

The beam training signals are transmitted periodically, or transmitted aperiodically.

The base station receives the uplink beam training signal transmitted by the UE, determines the reception quality of one or $N_{Traffic}^{UE,TX}$ UE TX traffic beams by measuring the uplink beam training signals, and determines BS RX traffic beams corresponding to the UE TX traffic beams. The reception quality of the uplink TX beams may be characterized by reference signal receiving power (RSRP), or may be characterized by other measurements.

The base station searches for the BS RX traffic beam having a transceiving reciprocity with the BS TX traffic beam with the best signal quality.

If there is a transceiving reciprocity relationship, for one uplink beam training signal, the base station uses the BS RX traffic beam having a transceiving reciprocity with the BS TX traffic beam with the best signal quality fed back by the UE as the receiving beam corresponding to UE TX traffic beam.

If there is no transceiving reciprocity relationship, for one UE TX traffic beam, the base station determines a corresponding BS RX traffic beam. The BS RX traffic beam of the base station may be selected from candidate BS RX traffic beams. The base station has a total of $N_{Traffic}^{BS,RX}$ BS RX traffic beams, each of which corresponds to a group of beamforming weights. The beamforming weight of the n-th BS RX traffic beam is $W_{Traffic,n}^{BS,RX}=[w_1^n \ w_2^n \ \ldots \ w_K^n]^T$, where K is the number of antenna units of the beamforming, which may be smaller than the number of antenna units of the base station. For example, the signals received by the K antenna units are weighted by beamforming weights, and then combined and sent to a transceiver unit. For one uplink beam training signal, the base station may try to receive it by using each BS RX traffic beam separately, and select the BS RX traffic beam with the strongest signal receiving power as the receiving beam corresponding to the UE TX traffic beam.

The base station selects a traffic beam combination with the best signal quality from one or $N_{Traffic}^{UE,TX}$ UE TX traffic beams and one or $N_{Traffic}^{BS,RX}$ BS RX traffic beams, issues an identifier of the UE TX traffic beam with the best signal quality in the traffic beam combination to the UE, and meanwhile stores an identifier of the BS RX traffic beam with the best signal quality in the traffic beam combination locally at the base station.

In this embodiment, the base station uses the best BS TX traffic beam to transmit a PDSCH signal, and the UE uses the best UE RX traffic beam to receive the PDSCH signal. The UE uses the best UE TX traffic beam to transmit a PUSCH signal, and the base station uses the best BS RX traffic beam to receive the PUSCH signal.

In this embodiment, in a case that the best UE RX traffic beam and/or the best BS TX traffic beam and/or the best UE TX traffic beam and/or the best BS RX traffic beam fails, the best UE RX common beam and/or the best BS TX common beam and/or the best UE TX common beam and/or the best BS RX common beam may be used to perform a connection recovery process. The common beam is used to recover traffic connection in a case that the connection state fails.

Based on the same inventive concept, a base station is further provided in an embodiment of the present disclosure. The principle of solving the problem by the base station is similar to that of the beam control method shown in FIG. 4 in the embodiment of the present disclosure. Therefore, for the implementation of the base station, reference may be made to the implementation of the method, and repeated description is omitted herein.

Figure 8:
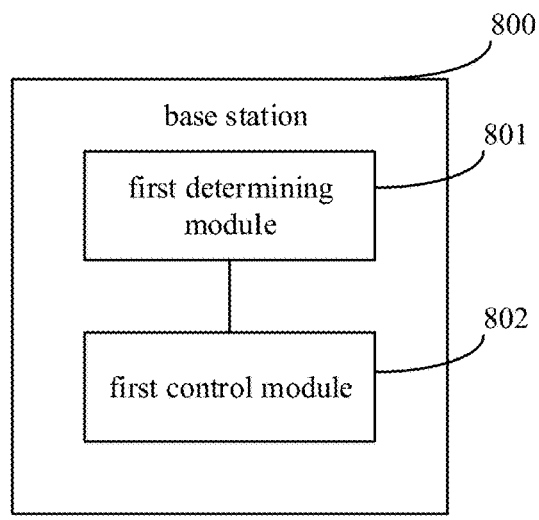
FIG. 8 is a schematic view of a base station in some embodiments of the present disclosure.

Referring to FIG. 8, a structure of a base station is shown, and the base station 800 includes:

a first determining module 801, configured to determine a type of a physical channel; and a first control module 802, configured to transmit or receive a signal of the physical channel by using a corresponding type of beam according to the type of the physical channel.

In some optional embodiments, the base station further includes: a first configuring module, configured to configure one or more of the following types of beams: a base station-transmitted common beam (BS TX common beam), a base station-received common beam (BS RX common beam), a base station-transmitted traffic beam (BS TX traffic beam), and a base station-received traffic beam (BS RX traffic beam).

In some optional embodiments, the base station further includes: a first identifying module, configured to identify a transceiving reciprocity relationship between the BS TX common beam and the BS RX common beam; or configured to identify a transceiving reciprocity relationship between the BS TX traffic beam and the BS RX traffic beam.

In some optional embodiments, the first control module transmit or receives a signal of the physical channel and is further configured to: use a BS TX common beam corresponding to the UE TX common beam to transmit a synchronization signal to a User Equipment (UE); or use a BS RX common beam to receive an uplink random access signal transmitted by the UE via a UE TX common beam.

In some optional embodiments, the synchronization signal of each BS TX common beam is transmitted after being shaped by a beamforming weight corresponding to the BS TX common beam.

In some optional embodiments, the synchronization signal is periodically transmitted according to a fixed time domain resource and a fixed frequency domain resource.

In some optional embodiments, the synchronization signal is periodically transmitted according to a time domain resource and a frequency domain resource at a predetermined offset.

In some optional embodiments, the synchronization signal is aperiodically transmitted on demand.

In some optional embodiments, the synchronization signal is periodically transmitted based on a preamble.

Alternatively, in some optional embodiments, the synchronization signal includes an identifier of the BS TX common beam.

In some optional embodiments, the uplink random access signal transmitted by each UE TX common beam is transmitted after being shaped by a beamforming weight corresponding to the UE TX common beam.

In some optional embodiments, the uplink random access signal includes an identifier of the UE TX common beam.

In some optional embodiments, the first control module includes:

a first selecting unit, configured to select a BS RX common beam having a transceiving reciprocity with a BS TX common beam with the best signal quality fed back by the UE as the BS RX common beam corresponding to the UE TX common beam; or select a BS RX common beam with the best signal quality as the BS RX common beam corresponding to the UE TX common beam.

In some optional embodiments, the first control module is further configured to: determine a common beam combination with the best signal quality according to a UE TX common beam and a BS RX common beam corresponding to the UE TX common beam, issue an identifier of the UE TX common beam with the best signal quality in the common beam combination with the best signal quality to the UE, and store an identifier of the BS RX common beam with the best signal quality in the common beam combination with the best signal quality locally at the base station.

In some optional embodiments, the first control module is further configured to: use a BS TX traffic beam to transmit a downlink beam training signal for a physical downlink shared channel (PDSCH) to the UE; or use a BS RX traffic beam corresponding to the UE TX traffic beam to receive an uplink beam training signal for a physical uplink shared channel (PUSCH) transmitted by the UE via the UE TX traffic beam.

In some optional embodiments, the downlink beam training signal transmitted by each BS TX traffic beam is transmitted after being shaped by a beamforming weight corresponding to the BS TX traffic beam.

In some optional embodiments, the downlink beam training signal is transmitted periodically, or transmitted aperiodically.

In some optional embodiments, the uplink beam training signal of each UE TX traffic beam is transmitted after being shaped by a beamforming weight corresponding to the UE TX traffic beam.

In some optional embodiments, the first control module includes: a second selecting unit, configured to select a BS RX traffic beam having a transceiving reciprocity with a BS TX traffic beam with the best signal quality fed back by the UE as the BS RX traffic beam corresponding to the UE TX traffic beam; or select a BS RX traffic beam with the best signal quality as the BS RX traffic beam corresponding to the UE TX traffic beam.

In some optional embodiments, the first control module is further configured to: determine a traffic beam combination with the best signal quality according to a UE TX traffic beam and a BS RX traffic beam corresponding to the UE TX traffic beam, issue an identifier of the UE TX traffic beam with the best signal quality in the traffic beam combination with the best signal quality to the UE, and store an identifier of the BS RX traffic beam with the best signal quality in the traffic beam combination with the best signal quality locally at the base station.

In some optional embodiments, the first control module is further configured to: use a BS TX traffic beam with the best signal quality fed back by the UE to transmit a PDSCH signal; or use a BS RX traffic beam with the best signal quality to receive a PUSCH signal.

In some optional embodiments, the base station further includes a first connection recovering module, configured to in a case that the BS TX traffic beam with the best signal quality and/or the BS RX traffic beam with the best signal quality fails, perform a connection recovery process using the BS TX common beam with the best signal quality fed back by the UE, and/or perform a connection recovery process using the BS RX common beam with the best signal quality.

Based on the same inventive concept, a User Equipment (UE) is further provided in an embodiment of the present disclosure. The principle of solving the problem by the UE is similar to that of the beam control method shown in FIG. 5 in the embodiment of the present disclosure. Therefore, for the implementation of the UE, reference may be made to the implementation of the method, and repeated description is omitted herein.

Figure 9:
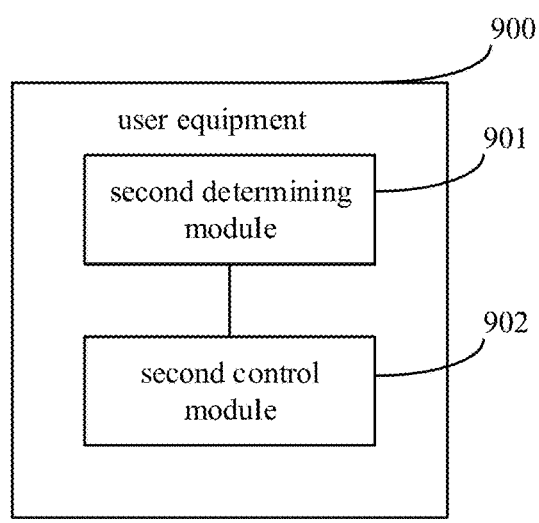
FIG. 9 is a schematic view of a UE in some embodiments of the present disclosure.

Referring to FIG. 9, a structure of a User Equipment (UE) is shown, and the UE 900 includes:

a second determining module 901, configured to determine a type of a physical channel; and a second control module 902, configured to receive or transmit a signal of the physical channel by using a corresponding type of beam according to the type of the physical channel.

In some optional embodiments, the UE further includes: configuring, by the UE, one or more of the following types of beams: a UE-transmitted common beam (UE TX common beam), a UE-received common beam (UE RX common beam), a UE-transmitted traffic beam (UE TX traffic beam), and a UE-received traffic beam (UE RX traffic beam).

In some optional embodiments, the UE further includes: a second identifying module, configured to identify a transceiving reciprocity relationship between the UE RX common beam and a base station-received common beam (BS RX common beam); or identify a transceiving reciprocity relationship between the UE RX traffic beam and the UE TX traffic beam.

In some optional embodiments, the second control module is further configured to: use a UE RX common beam corresponding to the base station-transmitted common beam (BS TX common beam) to receive a synchronization signal transmitted by the base station via the BS TX common beam; or use a UE TX common beam to transmit an uplink random access signal.

In some optional embodiments, the second control module is further configured to: determine a common beam combination with the best signal quality according to a BS TX common beam and a UE RX common beam corresponding to the BS TX common beam, issue an identifier of the BS TX common beam with the best signal quality in the common beam combination with the best signal quality to the base station, and store an identifier of the UE RX common beam with the best signal quality in the common beam combination locally at the UE.

In some optional embodiments, the second control module is further configured to: use a UE TX common beam having a transceiving reciprocity with a UE RX common beam with the best signal quality to transmit an uplink beam random access signal; or transmit an uplink random access signal via each candidate UE TX common beam.

In some optional embodiments, the second control module is further configured to: use a UE RX traffic beam corresponding to the BS TX traffic beam to receive a downlink beam training signal for a PDSCH transmitted by the base station using the BS TX traffic beam; or use a UE TX traffic beam to transmit an uplink beam training signal for a PUSCH.

In some optional embodiments, the second control module is further configured to: determine a traffic beam combination with the best signal quality according to a BS TX traffic beam and a UE RX traffic beam corresponding to the BS TX traffic beam, issue an identifier of the BS TX traffic beam with the best signal quality in the traffic beam combination with the best signal quality to the base station, and store an identifier of the UE RX traffic beam with the best signal quality in the traffic beam combination with the best signal quality locally at the UE.

In some optional embodiments, the second control module is further configured to: use a UE TX traffic beam having a transceiving reciprocity with a UE RX traffic beam with the best signal quality to transmit an uplink beam training signal for a PUSCH; or transmit an uplink beam training signal for the PUSCH via each candidate UE TX traffic beam.

Optionally, the second control module is further configured to: use the UE RX traffic beam with the best signal quality to receive a PDSCH signal; or use the UE TX traffic beam with the best signal quality fed back by the base station to transmit a PUSCH signal.

Optionally, the base station further includes a second connection recovering module, configured to in a case that the UE RX traffic beam with the best signal quality and/or the UE TX traffic beam with the best signal quality fails, perform a connection recovery process using the UE TX common beam with the best signal quality fed back by the base station, and/or perform a connection recovery process using the UE RX common beam with the best signal quality.

An embodiment of the present disclosure further provides a base station, which includes: a first storage, a first processor, and a computer program which is stored in the first storage and is capable of being executed by the first processor, where when the program is executed by the first processor, steps in the beam control method as shown in FIG. 4 and described in the corresponding embodiment are implemented.

Figure 10:
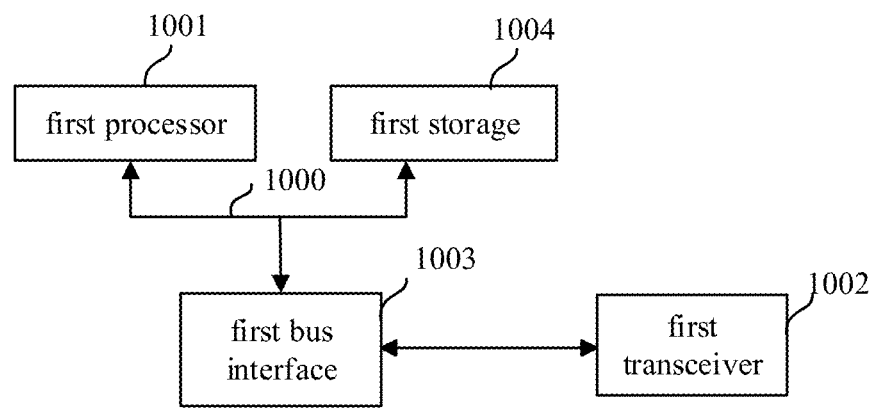
FIG. 10 is a schematic view of a base station in some other embodiments of the present disclosure.

Referring to FIG. 10, a structure of a base station is shown, which includes: a first storage 1004, a first processor 1001, and a computer program which is stored in the first storage 1004 and is capable of being executed by the first processor 1001, where when the program is executed by the first processor 1001, the following steps are implemented: determining a type of a physical channel; and transmitting or receiving a signal of the physical channel by using a corresponding type of beam according to the type of the physical channel.

In FIG. 10, a bus architecture (represented by a first bus 1000) may include any number of interconnected buses and bridges. Various circuits including one or more processors represented by the first processor 1001 and storages represented by the first storage 1004 are linked together by the first bus 1000. The first bus 1000 may also link various other circuits together, such as peripherals, voltage regulators, and power management circuits, which are well known in the art; therefore, no further description of them will be given herein. A first bus interface 1003 provides an interface between the first bus 1000 and a first transceiver 1002. The first transceiver 1002 may be one element, or a plurality of elements, such as a plurality of receivers and transmitters, providing a unit for communicating with various other devices over a transmission medium. For example, the first transceiver 1002 receives external data from other devices. The first transceiver 1002 is configured to transmit data processed by the first processor 1001 to other devices.

The first processor 1001 is responsible for managing the first bus 1000 and the general processing, such as running a general operating system. The first storage 1004 may be configured to store data used by the first processor 1001 in performing operations.

Optionally, the first processor 1001 may be a CPU, an Application Specific Integrated Circuit (ASIC), a Field-Programmable Gate Array (FPGA), or a Complex Programmable Logic Device (CPLD).

An embodiment of the present disclosure further provides a User Equipment (UE), which includes: a second storage, a second processor, and a computer program which is stored in the second storage and is capable of being executed by the second processor. When the program is executed by the second processor, steps in the beam control method as shown in FIG. 5 and described in the corresponding embodiment are implemented.

Figure 11:
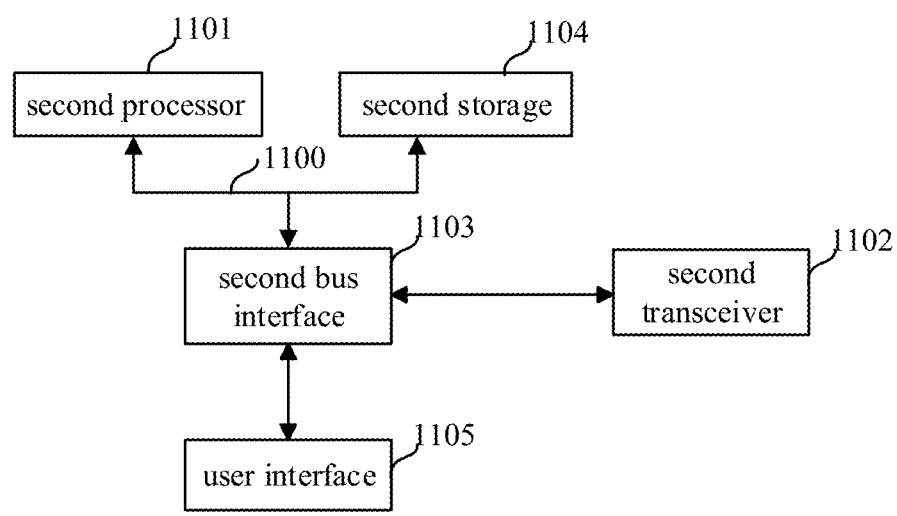
FIG. 11 is a schematic view of a UE in some other embodiments of the present disclosure.

Referring to FIG. 11, a structure of a UE is shown, which includes: a second storage, a second processor, and a computer program which is stored in the second storage and is capable of being executed by the second processor. When the program is executed by the second processor 1101, the following steps are implemented: determining a type of a physical channel; and receiving or transmitting a signal of the physical channel by using a corresponding type of beam according to the type of the physical channel.

In FIG. 11, a bus architecture (represented by a second bus 1100) may include any number of interconnected buses and bridges. Various circuits including one or more processors represented by the second processor 1101 and storages represented by the second storage 1104 are linked together by the second bus 1100. The second bus 1100 may also link various other circuits together, such as peripherals, voltage regulators, and power management circuits, which are well known in the art; therefore, no further description of them will be given herein. A second bus interface 1103 provides an interface between the second bus 1100 and a second transceiver 1102. The second transceiver 1102 may be one element, or a plurality of elements, such as a plurality of receivers and transmitters, providing a unit for communicating with various other devices over a transmission medium. For example, the second transceiver 1102 receives external data from other devices. The second transceiver 1102 is configured to transmit data processed by the second processor 1101 to other devices. Depending on the performances of the computing system, a user interface 1105 may also be provided, such as a keypad, a display, a speaker, microphone, and a joystick.

The first processor 1001 is responsible for managing the second bus 1100 and the general processing, such as running a general operating system. The second storage 1104 may be configured to store data used by the second processor 1101 in performing operations.

Optionally, the second processor 1101 may be a CPU, an Application Specific Integrated Circuit (ASIC), a Field-Programmable Gate Array (FPGA), or a Complex Programmable Logic Device (CPLD).

An embodiment of the present disclosure further provides a computer readable storage medium, on which a computer program is stored, where when the program is executed by a processor, steps in the beam control method as shown in FIG. 4 and described in the corresponding embodiment are implemented, or steps in the beam control method as shown in FIG. 5 and described in the corresponding embodiment are implemented.

It is to be understood that the phrase "one embodiment" or "an embodiment" mentioned throughout the specification means that particular features, structures or characteristics related to the embodiment are included in at least one embodiment of the present disclosure. Therefore, the phrase "in one embodiment" or "in an embodiment" appearing at various parts of the entire specification does not necessarily refer to the same embodiment. In addition, these particular features, structures, or characteristics may be combined in any suitable manner in one or more embodiments.

In various embodiments of the present disclosure, it should be understood that the magnitude of the serial numbers of the above processes does not mean the order of execution, and the order of execution of each process should be determined by its function and internal logic, and should not limit the implementation process of the embodiments of the present disclosure.

Additionally, the terms "system" and "network" are used interchangeably herein.

It should be understood that the term "and/or" as used herein is merely to describe an association relationship of associated objects, indicating that there may be three relationships. For example, A and/or B may indicate the following three situations: A exists separately, A and B exist simultaneously, and B exists separately. In addition, the symbol "/" as used herein generally indicates that the associated objects are of an "or" relationship.

In the embodiments provided by the present disclosure, it should be understood that "B corresponding to A" means that B is associated with A, and B can be determined according to A. However, it should also be understood that determining B according to A does not mean that B is determined only according to A; instead, B can also be determined according to A and/or other information.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of a combination of hardware functional units and software functional units.

The above described integrated unit implemented in the form of software functional unit can be stored in a computer readable storage medium. The above software functional unit is stored in a storage medium and includes a plurality of instructions for enabling a computer device (which may be a personal computer, a server, or a network side device, etc.) to execute part of the steps of the transceiving method at the various embodiments of the present disclosure. The foregoing storage medium includes: a U disk, a mobile hard disk, a Read-Only Memory (ROM), a Random Access Memory (RAM), a magnetic disk or an optical disk, and various media that are able to store program codes thereon.

Described above are optional embodiments of the present disclosure. It should be noted that those skilled in the art can also make numerous improvements and modifications without departing from the principles of the present disclosure, and these improvements and modifications shall also fall within the scope of protection of the present disclosure.

What is claimed is:

1. A beam control method, comprising:
   determining, by a base station, a type of a physical channel; and
   transmitting or receiving, by the base station, a signal of the physical channel by using a corresponding type of beam according to the type of the physical channel,
   wherein the method further comprises: configuring, by the base station, one or more of the following types of beams: a base station-transmitted (BS TX) common beam, a base station-received (BS RX) common beam, a BS TX traffic beam, and a BS RX traffic beam, wherein the BS TX common beam is wider than the BS TX traffic beam, and the BS RX common beam is wider than the BS RX traffic beam,
   wherein the transmitting or receiving, by the base station, the signal of the physical channel by using the corresponding type of beam according to the type of the physical channel comprises:
   for a synchronization channel, transmitting, by the base station, a synchronization signal to a User Equipment (UE), by using a BS TX common beam; or
   for an uplink random access channel, receiving, by the base station, an uplink random access signal transmitted by a UE-transmitted (UE TX) common beam, by using a BS RX common beam corresponding to the UE TX common beam; or transmitting, by the base station, a downlink beam training signal for a physical downlink shared channel (PDSCH) to the UE, by using a BS TX traffic beam; or receiving, by the base station, an uplink beam training signal for a physical uplink shared channel (PUSCH) that is transmitted via a UE-transmitted (UE TX) traffic beam, by using a BS RX traffic beam corresponding to the UE TX traffic beam; or transmitting, by the base station, a physical downlink shared channel (PDSCH) signal by using a BS TX traffic beam with the best signal quality fed back by the UE; or receiving, by the base station, a physical uplink shared channel (PUSCH) signal by using a BS RX traffic beam with the best signal quality.

2. The method according to claim 1, further comprising:
identifying, by the base station, a transceiving reciprocity relationship between the BS TX common beam and the BS RX common beam; or
identifying, by the base station, a transceiving reciprocity relationship between the BS TX traffic beam and the BS RX traffic beam.

3. The method according to claim 1, wherein the synchronization signal transmitted by each BS TX common beam is beamformed by a beamforming weight corresponding to the BS TX common beam, and is transmitted after being beamformed; and/or
wherein the synchronization signal is periodically transmitted based on a preamble; or the synchronization signal is periodically transmitted according to a fixed time domain resource and a fixed frequency domain resource; or the synchronization signal is periodically transmitted according to a time domain resource and a frequency domain resource at a predetermined offset; or the synchronization signal is aperiodically transmitted on demand; and/or
wherein the synchronization signal comprises an identifier of the BS TX common beam.

4. The method according to claim 1, wherein the uplink random access signal transmitted by each UE TX common beam is beamformed by a beamforming weight corresponding to the UE TX common beam, and is transmitted after being beamformed; and/or
wherein the uplink random access signal comprises an identifier of the UE TX common beam.

5. The method according to claim 4, wherein the BS RX traffic beam corresponding to the UE TX traffic beam comprises: a BS RX traffic beam having a transceiving reciprocity with a BS TX traffic beam with the best signal quality fed back by the UE; or a BS RX traffic beam with the best signal quality; and/or
wherein the method further comprises:
determining, by the base station, a traffic beam combination with the best signal quality according to a UE TX traffic beam and a BS RX traffic beam corresponding to the UE TX traffic beam, wherein the traffic beam combination with the best signal quality comprises: a UE TX traffic beam with the best signal quality and a BS RX traffic beam with the best signal quality; and
transmitting an identifier of the UE TX traffic beam with the best signal quality in the traffic beam combination with the best signal quality to the UE, and storing an identifier of the BS RX traffic beam with the best signal quality in the traffic beam combination with the best signal quality locally at the base station.

6. The method according to claim 1, wherein the BS RX common beam corresponding to the UE TX common beam comprises: a BS RX common beam having a transceiving reciprocity with a BS TX common beam with the best signal quality fed back by the UE; or a BS RX common beam with the best signal quality;
or
wherein the method further comprises:
determining, by the base station, a common beam combination with the best signal quality according to a UE TX common beam and a BS RX common beam corresponding to the UE TX common beam, wherein the common beam combination with the best signal quality comprises: a UE TX common beam with the best signal quality and a BS RX common beam with the best signal quality; and
transmitting an identifier of the UE TX common beam with the best signal quality in the common beam combination with the best signal quality to the UE, and storing an identifier of the BS RX common beam with the best signal quality in the common beam combination with the best signal quality locally at the base station.

7. The method according to claim 1, wherein the downlink beam training signal transmitted by each BS TX traffic beam is beamformed by a beamforming weight corresponding to the BS TX traffic beam, and is transmitted after being beamformed; and
wherein the uplink beam training signal transmitted by each UE TX traffic beam is beamformed by a beamforming weight corresponding to the UE TX traffic beam, and is transmitted after being beamformed.

8. The method according to claim 1, wherein the transmitting or receiving, by the base station, the signal of the physical channel by using the corresponding type of beam according to the type of the physical channel comprises:
wherein the method further comprises:
performing, in a case that at least one of the BS TX traffic beam with the best signal quality or the BS RX traffic beam with the best signal quality fails, a connection recovery process by the base station using at least one of the BS TX common beam with the best signal quality fed back by the UE, or the BS RX common beam with the best signal quality.

9. A beam control method, comprising:
determining, by a User Equipment (UE), a type of a physical channel; and
receiving or transmitting, by the UE, a signal of the physical channel by using a corresponding type of beam according to the type of the physical channel,
wherein the method further comprises: configuring, by the UE, one or more of the following types of beams: a UE-transmitted (UE TX) common beam, a UE-received (UE RX) common beam, a UE TX traffic beam, and a UE RX traffic beam,
wherein the receiving or transmitting, by the UE, the signal of the physical channel by using the corresponding type of beam according to the type of the physical channel comprises:
for a synchronization channel, receiving, by the UE, a synchronization signal transmitted by a base station-transmitted (BS TX) common beam, by using a UE RX common beam corresponding to the BS TX common beam; or for an uplink random access channel, transmitting, by the UE, an uplink random access signal by using a UE TX common beam; or receiving, by the UE, a downlink beam training signal for a physical downlink shared channel (PDSCH) that is transmitted by a base station using the BS TX traffic beam, by using a UE RX traffic beam corresponding to the BS TX traffic beam; or transmitting, by the UE, an uplink beam training signal for a physical uplink shared channel (PUSCH) by using a UE TX traffic beam; or receiving, by the UE, a PDSCH signal by using the UE RX traffic beam with the best signal quality; or transmitting, by the UE, a PUSCH signal by using the UE TX traffic beam with the best signal quality fed back by a base station.

10. The method according to claim 9, further comprising:
identifying, by the UE, a transceiving reciprocity relationship between the UE RX common beam and the UE TX common beam; or
identifying, by the UE, a transceiving reciprocity relationship between the UE RX traffic beam and the UE TX traffic beam.

11. The method according to claim 9, further comprising:
determining, by the UE, a common beam combination with the best signal quality according to a BS TX common beam and a UE RX common beam corresponding to the BS TX common beam, wherein the common beam combination with the best signal quality comprises: a BS TX common beam with the best signal quality and a UE RX common beam with the best signal quality; and
feeding back an identifier of the BS TX common beam with the best signal quality in the common beam combination with the best signal quality to a base station, and storing an identifier of the UE RX common beam with the best signal quality in the common beam combination with the best signal quality locally at the UE; and/or
wherein the transmitting, by the UE, the uplink random access signal by using the UE TX common beam comprises:
transmitting, by the UE, the uplink random access signal by using a UE TX common beam having a transceiving reciprocity with a UE RX common beam with the best signal quality; or
transmitting, by the UE, an uplink random access signal via each candidate UE TX common beam.

12. The method according to claim 9, wherein the receiving or transmitting, by the UE, the signal of the physical channel by using the corresponding type of beam according to the type of the physical channel comprises:
wherein the method further comprises:
determining, by the UE, a traffic beam combination with the best signal quality according to a BS TX traffic beam and a UE RX traffic beam corresponding to the BS TX traffic beam, wherein the traffic beam combination with the best signal quality comprises: a BS TX traffic beam with the best signal quality and a UE RX traffic beam with the best signal quality; and
feeding back an identifier of the BS TX traffic beam with the best signal quality in the traffic beam combination with the best signal quality to the BS, and storing an identifier of the UE RX traffic beam with the best signal quality in the traffic beam combination with the best signal quality locally at the UE; or wherein the transmitting, by the UE, the uplink beam training signal for the PUSCH by using the UE TX traffic beam comprises:
transmitting, by the UE, the uplink beam training signal for the PUSCH by using a UE TX traffic beam having a transceiving reciprocity with the UE RX traffic beam with the best signal quality; or
transmitting, by the UE, the uplink beam training signal for the PUSCH via each candidate UE TX traffic beam.

13. The method according to claim 9, wherein the receiving or transmitting, by the UE, the signal of the physical channel by using the corresponding type of beam according to the type of the physical channel comprises:
wherein the method further comprises:
performing, in a case that at least one of the UE RX traffic beam with the best signal quality or the UE TX traffic beam with the best signal quality fails, a connection recovery process by the UE using at least one of the UE TX common beam with the best signal quality fed back by the base station, or the UE RX common beam with the best signal quality.

14. A User Equipment (UE), comprising: a second storage, a second processor, and a computer program that is stored in the second storage and executable by the second processor, wherein when the program is executed by the second processor, the second processor is configured to perform steps in the beam control method according to claim 9.

15. A base station, comprising: a first storage, a first processor, and a computer program that is stored in the first storage and executable by the first processor, wherein when the program is executed by the first processor, the first processor is configured to: determine a type of a physical channel; and
transmit or receive a signal of the physical channel by using a corresponding type of beam according to the type of the physical channel,
wherein the method further comprises: configuring, by the base station, one or more of the following types of beams: a base station-transmitted (BS TX) common beam, a base station-received (BS RX) common beam, a BS TX traffic beam, and a BS RX traffic beam, wherein the BS TX common beam is wider than the BS TX traffic beam, and the BS RX common beam is wider than the BS RX traffic beam,
wherein the processor is configured to:
for a synchronization channel, transmit a synchronization signal to a User Equipment (UE), by using a BS TX common beam; or
for an uplink random access channel, receive an uplink random access signal transmitted by a UE-transmitted (UE TX) common beam, by using a BS RX common beam corresponding to the UE TX common beam; or
transmit a downlink beam training signal for a physical downlink shared channel (PDSCH) to the UE, by using a BS TX traffic beam; or
receive an uplink beam training signal for a physical uplink shared channel (PUSCH) that is transmitted via a UE-transmitted (UE TX) traffic beam, by using a BS RX traffic beam corresponding to the UE TX traffic beam; or
transmit a physical downlink shared channel (PDSCH) signal by using a BS TX traffic beam with the best signal quality fed back by the UE; or
receive a physical uplink shared channel (PUSCH) signal by using a BS RX traffic beam with the best signal quality.

16. The base station according to claim 15, wherein the processor is further configured to:
- identify a transceiving reciprocity relationship between the BS TX common beam and the BS RX common beam; or
- identify a transceiving reciprocity relationship between the BS TX traffic beam and the BS RX traffic beam.

17. The base station according to claim 15, wherein the synchronization signal transmitted by each BS TX common beam is beamformed by a beamforming weight corresponding to the BS TX common beam, and is transmitted after being beamformed; and/or
- wherein the synchronization signal is periodically transmitted based on a preamble; or the synchronization signal is periodically transmitted according to a fixed time domain resource and a fixed frequency domain resource; or the synchronization signal is periodically transmitted according to a time domain resource and a frequency domain resource at a predetermined offset; or the synchronization signal is aperiodically transmitted on demand; and/or
- wherein the synchronization signal comprises an identifier of the BS TX common beam.

18. The base station according to claim 15, wherein the uplink random access signal transmitted by each UE TX common beam is beamformed by a beamforming weight corresponding to the UE TX common beam, and is transmitted after being beamformed; and/or
- wherein the uplink random access signal comprises an identifier of the UE TX common beam.

19. The base station according to claim 15, wherein the processor is further configured to:
- determine a common beam combination with the best signal quality according to a UE TX common beam and a BS RX common beam corresponding to the UE TX common beam, wherein the common beam combination with the best signal quality comprises: a UE TX common beam with the best signal quality and a BS RX common beam with the best signal quality; and
- transmit an identifier of the UE TX common beam with the best signal quality in the common beam combination with the best signal quality to the UE, and store an identifier of the BS RX common beam with the best signal quality in the common beam combination with the best signal quality locally at the base station.

* * * * *